(12) United States Patent
Brouwer et al.

(10) Patent No.: US 11,059,658 B2
(45) Date of Patent: Jul. 13, 2021

(54) PRESSURE CONTROL SYSTEM

(71) Applicant: AIROPACK TECHNOLOGY GROUP B.V., RK Waalwijk (NL)

(72) Inventors: Mark Brouwer, RK Waalwijk (NL); William Dierickx, RK Waalwijk (NL); Tom Anthierens, RK Waalwijk (NL)

(73) Assignee: AIROPACK TECHNOLOGY GROUP B.V., Waalwijk (NL)

( * ) Notice: Subject to any disclaimer, the term of this patent is extended or adjusted under 35 U.S.C. 154(b) by 0 days.

(21) Appl. No.: 15/546,830

(22) PCT Filed: Jan. 28, 2016

(86) PCT No.: PCT/EP2016/051837
§ 371 (c)(1),
(2) Date: Jul. 27, 2017

(87) PCT Pub. No.: WO2016/120404
PCT Pub. Date: Aug. 4, 2016

(65) Prior Publication Data
US 2017/0327302 A1    Nov. 16, 2017

(30) Foreign Application Priority Data

Jan. 28, 2015   (EP) .................................... 15152846

(51) Int. Cl.
*B65D 83/38*     (2006.01)
*B65D 83/66*     (2006.01)
(Continued)

(52) U.S. Cl.
CPC .......... *B65D 83/38* (2013.01); *B29C 65/1635* (2013.01); *B29C 66/5452* (2013.01); *B65D 83/64* (2013.01); *B65D 83/663* (2013.01)

(58) Field of Classification Search
CPC ............ B29C 65/1635; B29C 66/5452; B29C 66/636; B29C 66/5432; B29C 66/71;
(Continued)

(56) References Cited

U.S. PATENT DOCUMENTS 3,557,827 A * 1/1971 Marsh .................... B01J 47/022
                                                          137/590
5,110,014 A * 5/1992 Doundoulakis ...... B67D 1/0412
                                                           222/396
(Continued)

FOREIGN PATENT DOCUMENTS

WO      2005/082744 A1      9/2005
WO      2014/083531 A2      6/2014

OTHER PUBLICATIONS

International Search Report for PCT Serial No. PCT/EP2016/051837 dated May 11, 2016.
(Continued)

*Primary Examiner* — Paul R Durand
*Assistant Examiner* — Robert K Nichols, II
(74) *Attorney, Agent, or Firm* — Lathrop GPM LLP; Wm. Tucker Griffith

(57) ABSTRACT

A novel pressure control system provided for maintaining a constant predetermined excess pressure in a fluid dispensing container comprises a high-pressure plastic vessel having an inner chamber and an upper open end, and a pressure control device with a valve, which pressure control device is mounted on the upper open end of the high-pressure vessel, whereas a passageway is provided from the inner chamber to the outside, which is controlled by the valve, wherein the vessel is substantially cylindrical.
The upper part of the vessel has a spherical dome with a cylindrical insert provided for receiving the pressure control
(Continued)

device and the lower end of the vessel has an open end, which is closed by a ring-shaped closure.

4 Claims, 3 Drawing Sheets

(51) Int. Cl.
  *B29C 65/16* (2006.01)
  *B29C 65/00* (2006.01)
  *B65D 83/64* (2006.01)
(58) Field of Classification Search
  CPC ...... B65D 83/64; B65D 83/38; B65D 83/663;
  B65D 83/44; B65D 63/70
  USPC ......................................... 222/394
  See application file for complete search history.

(56) References Cited

U.S. PATENT DOCUMENTS

| | | | | |
|---|---|---|---|---|
| 5,285,931 | A * | 2/1994 | Alfons | B65D 83/663 137/903 |
| 6,499,632 | B2 * | 12/2002 | van't Hoff | B65D 83/64 222/389 |
| 9,790,019 | B2 * | 10/2017 | Brouwer | B65D 83/64 |
| 2015/0300568 | A1 * | 10/2015 | Smits | F17C 1/00 53/440 |

OTHER PUBLICATIONS

Written Opinion of the International Searching Authority for PCT. Serial No. PCT/EP2016/051837 dated May 11, 2016.

* cited by examiner

PRESSURE CONTROL SYSTEM

CROSS-REFERENCE TO RELATED APPLICATIONS

This application is a National Stage application of International Patent Application No. PCT/EP2016/051837, filed on Jan. 28, 2016, which claims priority to European Patent Application No. EP15152846.0, filed on Jan. 28, 2015, each of which is hereby incorporated by reference in its entirety.

TECHNICAL FIELD

The invention pertains to a pressure control system provided for maintaining a constant predetermined excess pressure in a fluid dispensing container, comprising a high-pressure plastic vessel having an inner chamber and a closed end and an open end, and a pressure control device with a valve, which pressure control device is mounted on the open end of the high-pressure vessel, whereas a passageway is provided from the inner chamber to the outside, which is controlled by the valve.

BACKGROUND OF THE INVENTION

Such a pressure control system is described in WO-A-2005/082744, wherein the high-pressure vessel is substantially cylindrical with a tapered neck portion and a flange, on which a ring-shaped insert or closure with a step-like funnel is mounted. The pressure control device of this document is provided within the ring-shaped closure by a cup-like cylinder having a closed end and an open end, in which a piston with a downward protruding stem and a broader cylindrical end portion is movable mounted. At the open end of the step-like funnel an O-ring is pinched by a ring-cylinder, whereas the broader cylindrical portion of the stem and the O-ring provide a valve which is moved reciprocated by the pressure of the air in the chamber formed by the piston and the cup-like cylinder with its closed end. The high-pressure vessel must stand an overpressure of 8 bar so that the construction should be very stable. For this reason the high-pressure vessel is widened gradually towards its lower end with a broader end portion and an inwardly projecting rim, on which the end of a plastic fluid dispensing container rests. The bottom part of the high-pressure vessel has a ring-shaped depression which is reinforced with a central opening, in which a so-called Nicholson plug of rubber is pressed.

The high-pressure vessel of this document is manufactured by an injection stretch blow moulding process, in which the used polymer is melted and moulded onto a core pin. Then the core pin is rotated to a blow moulding station to be inflated and cooled. The injection blow moulding machine is based on an extruder barrel and screw assembly which melts the polymer. The molten polymer is fed into a hot runner manifold where it is injected through nozzles into a heated cavity and core pin.

The cavity mould forms the external shape and is clamped around a core rod which forms the internal shape of the preform. The preform consists of a fully formed bottle/jar neck with a thick tube of polymer attached, which will form the body. The preform mould opens and the core rod is rotated and clamped into the hollow, chillled blow mould. The end of the core rod opens and allows compressed air into the preform, which inflates it to the finished article shape. After a cooling period the blow mould opens and the core rod is rotated to the ejection position. The finished article is stripped off the core rod and as an option can be leak-tested prior to packing. The preform and blow mould can have many cavities, typically three to sixteen depending on the article size and the required output. There are three sets of core 15 rods, which allow concurrent preform injection, blow moulding and ejection.

In the present construction the high-pressure vessel is further closed by a moulded bottom plate. With today's plastic material not all conditions as strength, creep, air permeability, resistance to heat and cold, chemical resistance against known chemicals, etc. can be fulfilled. If the vessel has to be enlarged, forces on the bottom plate will become much larger, so that the maximum volume of the present vessel is restricted.

The volume of the high-pressure vessel is further restricted by the production process of stretch blow moulding, i.e. in order to obtain a reinforced opening at both ends of the high-pressure vessel the process of stretching the heated plastic depends on the thickness of the preform before stretching. In practice the preform can be expanded only to a predefined width and length to obtain the prescribed stability.

SUMMARY OF THE INVENTION

It is an object of the present invention to provide a pressure control system with a high-pressure vessel which may have a larger volume as the known high-pressure vessel. This object of the invention is accomplished by a pressure control system with the features of claim 1.

According to embodiments of the invention, the pressure control system provided for maintaining a constant predetermined excess pressure in a fluid dispensing container, comprises a high-pressure plastic vessel having an inner chamber and an upper open end, and a pressure control device with a valve, which pressure control device is mounted on the upper open end of the high-pressure vessel. A passageway is provided from the inner chamber to the outside, which is controlled by the valve, wherein the vessel is substantially cylindrical. The upper part of the vessel has a spherical dome with a cylindrical insert provided for receiving the pressure control device and the lower end of the vessel has an open end, which is closed by a ring-shaped closure.

The present invention has the main advantage, that the vessel is spherical which can withstand larger forces so that the diameter of the high-pressure vessel can be enlarged with less restrictions and the vessel can be provided for higher pressures.

A further advantage of the present invention is that the production of the high-pressure vessel is more cost effective.

Further advantages of the invention can be derived from the dependent claims and from the description below.

According to an embodiment of the pressure control system, the ring-shaped closure has internal reinforcing fins which are uniformly distributed over the inner surface of the closure. The fins strengthen the closure such that a gas with a higher pressure may be held in the high-pressure vessel.

According to another embodiment of the pressure control system the vessel is made by injection molding from PET. Injection moulding from PET is an economical method for production of vessels. PET is suitable for high-pressure applications.

According to a further embodiment of the pressure control system, the closure is connected to the lower open end of the vessel by laser welding. Through laser welding a gas-tight connection will be obtained between the closure and the vessel.

BRIEF DESCRIPTION OF THE FIGURES

In the following, the invention is described in greater detail, by way of example, with reference to the accompanying drawings. It shows.

DETAILED DESCRIPTION OF PREFERRED EMBODIMENTS

Figure 1:
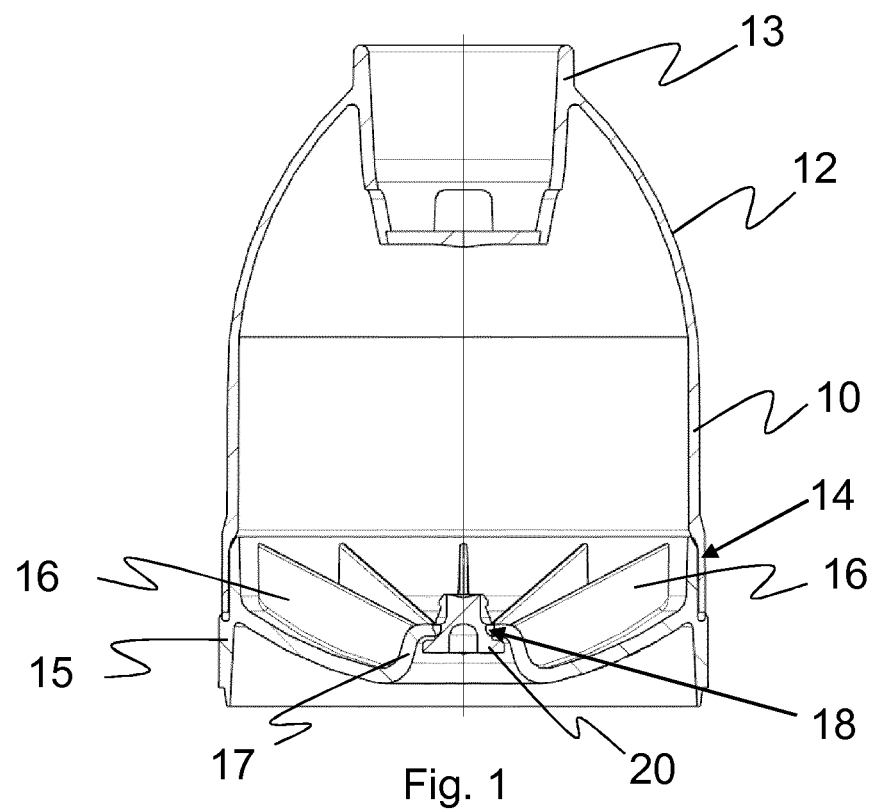
FIG. 1 is a high-pressure vessel with a ring-shaped closure.

In FIG. 1 a high-pressure plastic vessel 10 is depicted, which is substantially cylindrical and has in the upper part a spherical dome 12 with a cylindrical insert 13.

The vessel 10 with the dome 12 and the insert 13 is made of one piece from a suitable plastic material as PET by injection moulding. The lower end 14 of the vessel 10 is open and is closed by a ring-shaped closure 15, which has internal reinforcing fins 16, which are uniformly distributed over the surface of the closure 15. In the closure 15 a reinforced retracted ring 17 with a central bore 18 is provided, in which a Nicholson plug 20 is clamped. The closure 15 is connected to the vessel 10 5 by laser welding.

The advantage of injection moulding of the high-pressure vessel 10 is that the vessel 15 has its final form and does not have to cut as in the injection stretch blow moulding process previously mentioned. The melt polymer will be injected centrally in order to obtain a uniform material distribution. The wall thickness is chosen between 1.0 and 2.0 mm, preferably 1.4 mm, so that the high-pressure vessel 10 can withstand high gas pressures of 10 bar and higher temperatures up to 50° C.

Figure 2:
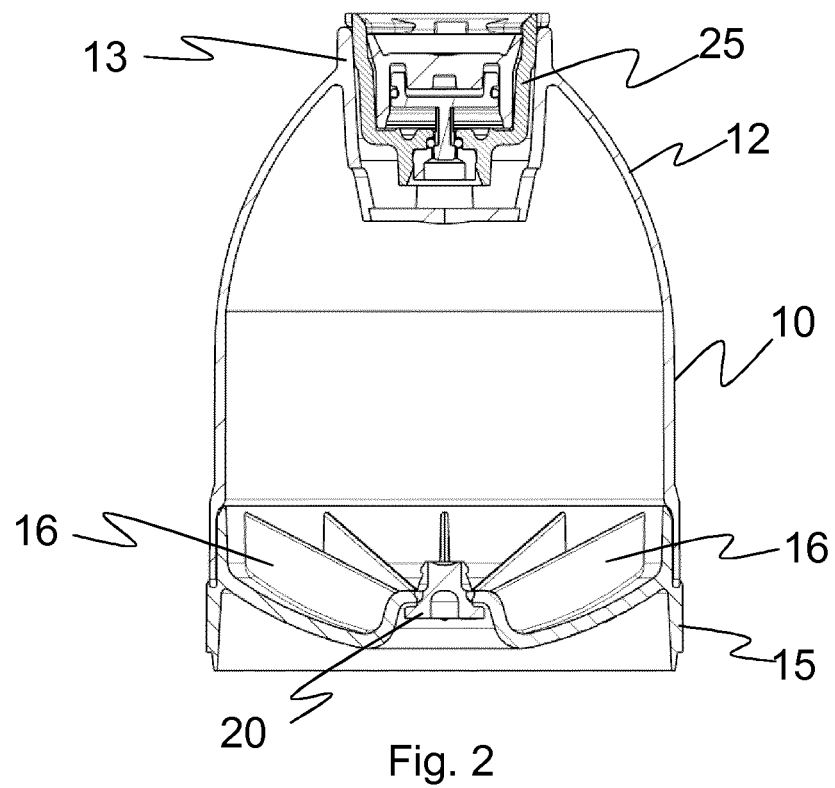
FIG. 2 shows the high-pressure vessel of FIG. 1 with a pressure control device on top.

In FIG. 2 an assembled pressure control system 1 is shown, which comprises the vessel 10 and a pressure control device 25 which is fixedly received in the cylindrical insert 13. The construction of the pressure control device 25 is in principle the same as described in full details in WO-A-2005/082744.

Figure 3:
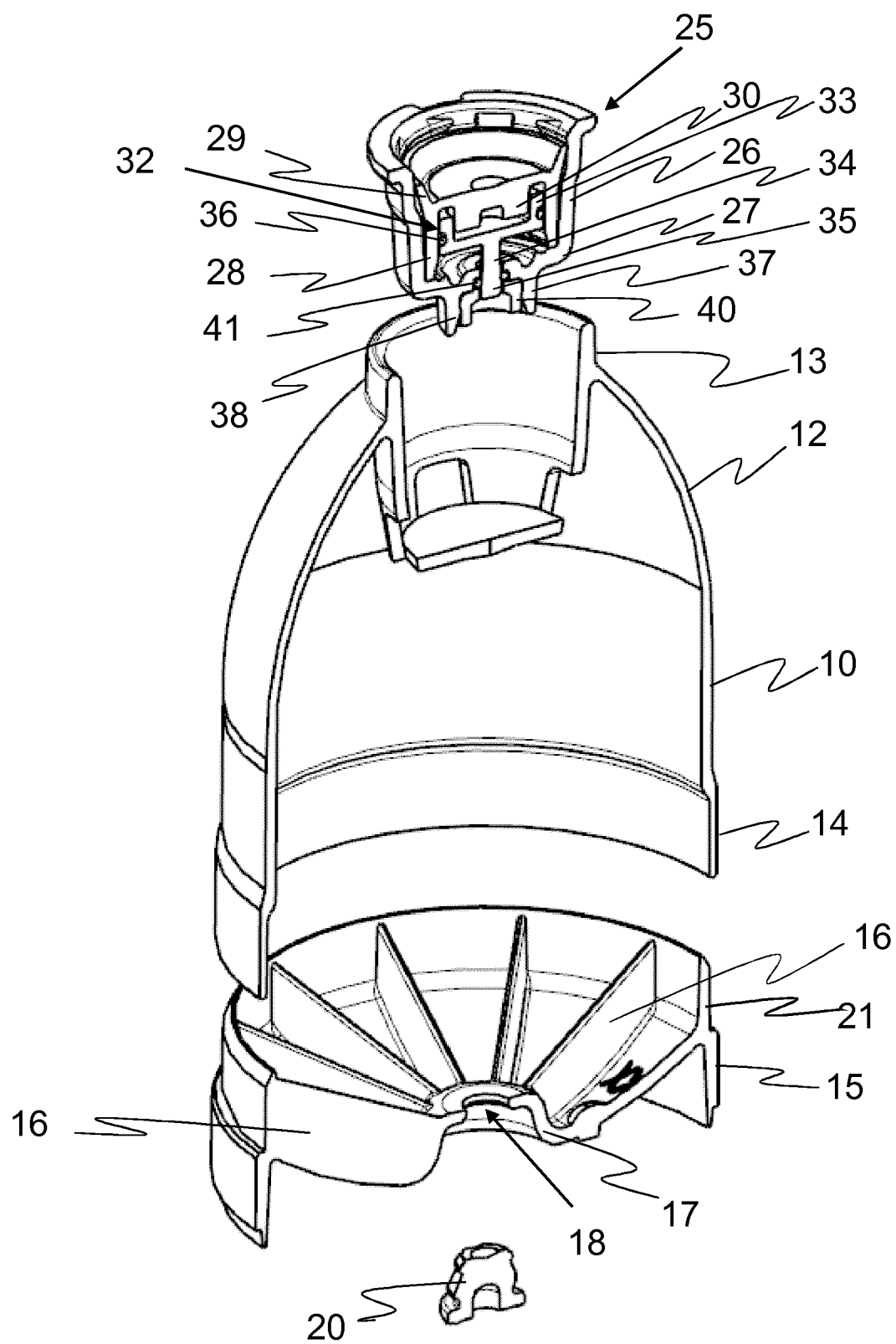
FIG. 3 shows the high-pressure vessel of FIG. 2 in perspective and cross-sectional view, whereas the vessel is shown in an exploded view.

FIG. 3 shows the pressure control system 1 in exploded view. As can be seen in the figure the lower end 14 of the vessel 10 and the upper end 21 of the closure 15 have each a reduced thickness, such that the the thickness of the joint between the lower end 14 of the vessel 10 and the upper end 21 of the closure 15 is equal to the overall wall thickness of the vessel 10. The pressure control device 25 has a cuplike insert or upper closure 26 having a step-like funnel 27. Within the upper closure 26 an integral cylindrical insert 28 is pinched which has an upper widened crown 29 which is press-fit with the inner wall of the upper closure 26. Further the cylindrical insert 28 has an inner protruding ring 30. A piston 32 with a piston cup 33 and a stem 34 with a thickened end part 35 is provided within the cylindrical insert 28 and is guided by the protruding ring 30. Further the piston 32 is provided with an outer O-ring 36 which seals the piston 32 to the inner wall of the cylindrical insert 28. The step-like funnel 27 has downwardly a cylindrical clamping portion 37 with a ring shaped barb 38 which clamps a ring cylinder 40. The upper end of the ring cylinder 40 pinches a sealing O-ring 41, which functions together with the thickened end part 35 of the stem as a valve.

In FIG. 3 the closure 15 with the uniformly distributed fins 16 and the reinforced retracted ring 17 is shown in perspective view from the upper side.

Figure 4:
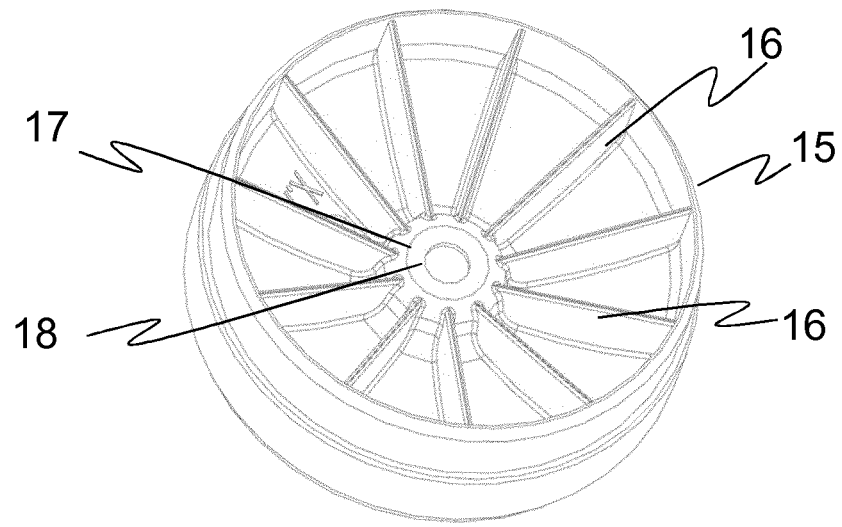
FIG. 4 shows a perspective view on the closure with the reinforcing fins, and FIG. 5a perspective view on the closure 15 from the lower side.
Figure 5:
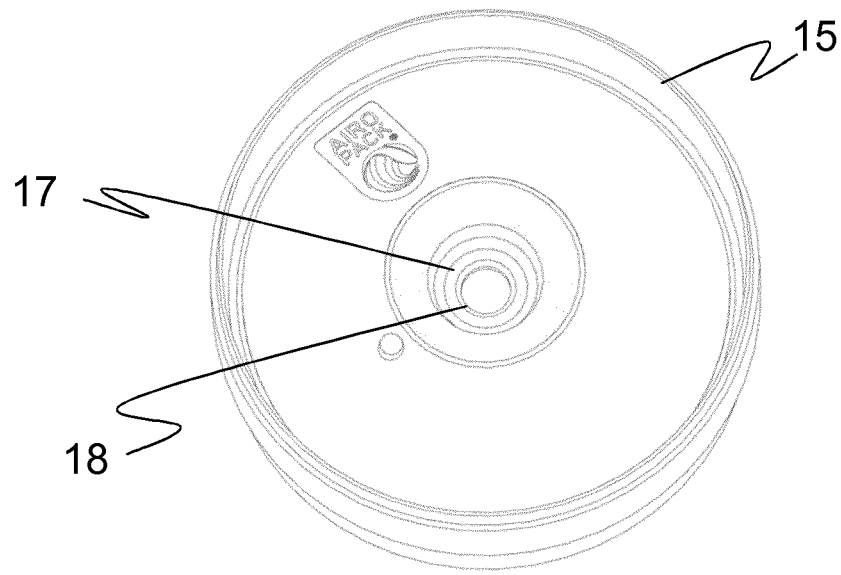

In FIG. 4 the closure 15 is shown in perspective view from the lower side.

While the present invention has been illustrated and described with respect to a particular embodiment thereof, it should be appreciated by those of ordinary skill in the art that various modifications to this invention may be made without departing from the spirit and scope of the present.

The invention claimed is:

1. A pressure control system provided for maintaining a constant predetermined excess pressure in a fluid dispensing container, comprising a high-pressure plastic vessel having an inner chamber, an upper open end, and a lower open end which is closed by a ring-shaped closure, wherein the vessel is substantially cylindrical and the upper part of the vessel has a spherical dome with a cylindrical insert, said cylindrical insert extends from the upper open end of the vessel inwardly into the inner chamber of the vessel, wherein the vessel and the cylindrical insert are collectively made of one piece from a suitable plastic material; said pressure control system further comprising a pressure control device with a valve, which pressure control device is mounted at the upper open end of the high-pressure vessel and spaced from the lower open end, whereas a passageway is provided from the inner chamber to the outside of the high-pressure vessel, which is controlled by the valve, wherein the pressure control device is fixedly received within the cylindrical insert, such that the pressure control device is located inside the vessel proximate to the upper open end of the high-pressure vessel.

2. The pressure control system according to claim 1, wherein the vessel with the cylindrical insert is made by injection moulding from PET.

3. A pressure control system provided for maintaining a constant predetermined excess pressure in a fluid dispensing container, comprising:

a high-pressure plastic vessel having an inner chamber, an upper open end, and a lower open end which is closed by a ring-shaped closure, wherein the vessel is substantially cylindrical and the upper part of the vessel has a spherical dome with a cylindrical insert, said cylindrical insert extends from the upper open end of the vessel inwardly into the inner chamber of the vessel, wherein the vessel and the cylindrical insert are collectively made of one piece from a suitable plastic material;

said pressure control system further comprising a pressure control device with a valve, which pressure control device is mounted on the upper open end of the high-pressure vessel, whereas a passageway is provided from the inner chamber to the outside of the high-pressure vessel, which is controlled by the valve, wherein the pressure control device is fixedly received within the cylindrical insert, such that the pressure control device is located inside the vessel, wherein the ring-shaped closure has internal reinforcing fins which are uniformly distributed over the inner surface of the ring-shaped closure.

4. The pressure control system according to claim 3, wherein the ring-shaped closure is connected to the lower open end of the vessel by laser welding.

\* \* \* \* \*